P. SCHULZE.
Egg Carrier.

No. 201,453. Patented March 19, 1878.

Witnesses:

Inventor
Paul Schultze

UNITED STATES PATENT OFFICE.

PAUL SCHULZE, OF WASHINGTON, DISTRICT OF COLUMBIA, ASSIGNOR OF ONE-HALF HIS RIGHT TO CHARLES E. BEHLE, OF SAME PLACE.

IMPROVEMENT IN EGG-CARRIERS.

Specification forming part of Letters Patent No. 201,453, dated March 19, 1878; application filed February 26, 1878.

*To all whom it may concern:*

Be it known that I, PAUL SCHULZE, of Washington city, in the District of Columbia, have invented certain new and useful Improvements in Carriers for Eggs, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to carriers for eggs, fruit, and other like perishable articles that are to be transported long distances; and the object is to provide a carrier for such articles that they will not be easily broken, and prevent fruit from decaying by coming in contact with each other.

The invention consists in an improvement in those kinds of carriers in which the articles are held between four adjacent holders made of elastic tubes supported on pins or a frame-work.

I use, instead of the tubes, which only hold the articles in one place, elastic spherical or elliptical balls, which, when the eggs, &c., are placed in position, are elongated, and not only hold them at the central part, but by the concavities of the balls the convexities of the eggs, &c., are received, and thus securely and firmly held, all of which will be more fully described hereinafter, reference being had to the accompanying drawings, in which—

Figure 1:
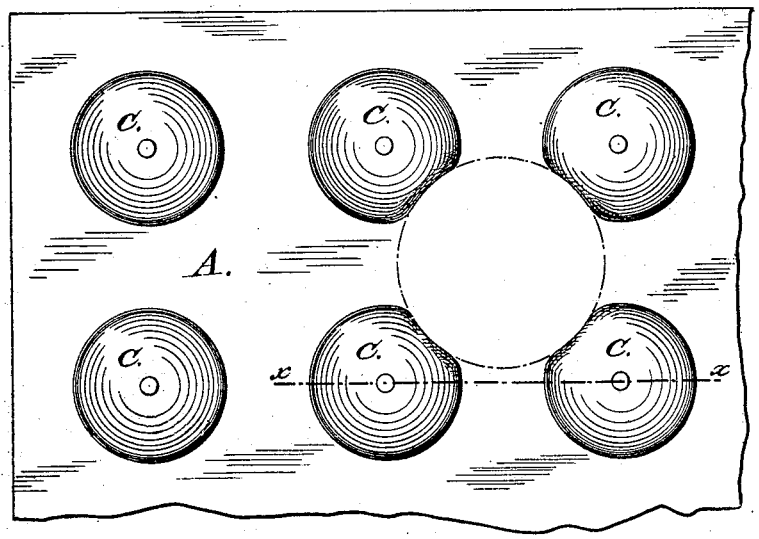
Figure 2:
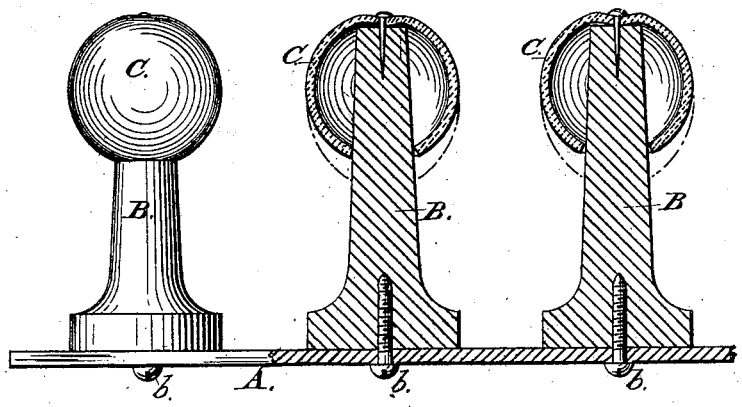

Figure 1 is a plan view, showing an egg in dotted lines in position on one side. Fig. 2 is a side elevation, partly in section, on line *x x*.

In the drawing, A represents a plate of wood, tin, pasteboard, or other suitable material, to which a series of blocks or pins, B, are secured by screws *b*, or in any other manner. To these pins B spherical or elliptical balls C, made of india-rubber or other suitable material, are secured in any well-known manner.

Between every adjacent four balls C the eggs, fruit, (such as apples, pears, peaches, &c.,) are placed, and by being forced between said balls they become elongated, as the lower part is free to move up and down on the pins, and the concavities thus formed embrace the convexities of the eggs, &c., and firmly hold them, not only at the central part, but also above and below, so that it is impossible for them to become broken, or, with fruit, to become bruised, or to touch each other, and thus decay.

The plates A are usually made of such a size as to carry a dozen eggs, &c., and fit into boxes made for the purpose, and the screw-heads holding the pins on the upper plates rest on the nails or screw-heads, holding the balls of the lower plate, and keep them the proper distance apart.

I am aware that carriers with vertical tubes held on the blocks are not new; also, that short pieces of tubes have been secured to a frame-work, and therefore disclaim such; but I claim that the spherical or elliptical balls are advantageous in more securely holding the articles to be transported.

The advantages of my invention are, that the articles can be easily and safely transported to great distances; it can be very cheaply made; in case the carrier should become soiled in any manner it can be readily washed; and the eggs, &c., can be packed very closely. It can be made of any suitable material, although I prefer to make the balls of india-rubber or similar elastic material.

Having thus described my invention, I claim and desire to secure by Letters Patent—

1. In a carrier for eggs, &c., the spherical or elliptical elastic balls C, secured to pins or a frame-work, as shown, and for the purpose set forth.

2. A carrier for eggs, &c., consisting of the plate A, the pins or blocks B, and the spherical or elliptical balls C, all constructed and arranged as shown, and for the purpose herein described.

In testimony that I claim the foregoing as my own I hereby affix my signature in presence of two witnesses.

PAUL SCHULZE.

Witnesses:
CHAS. E. BEHLE,
SAML. C. MILLS.